(No Model.) 3 Sheets—Sheet 2.

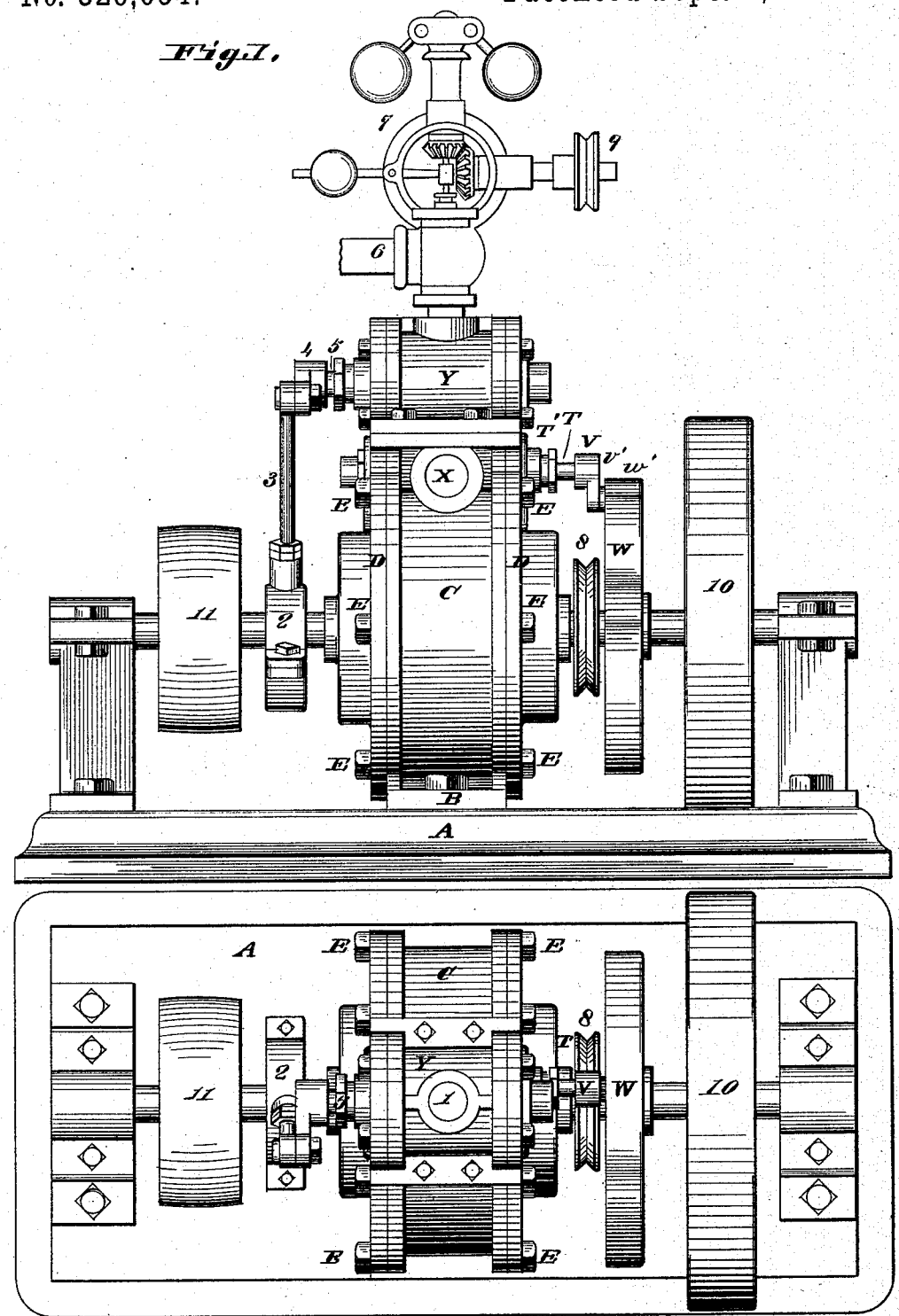

W. O'KEEFE.
ROTARY ENGINE.

No. 326,054. Patented Sept. 8, 1885.

Attest:
Edward Stew.
Geo. L. Wheelock.

Inventor:
William O'Keefe
By Knight Bro.
Attys.

(No Model.) 3 Sheets—Sheet 3.
W. O'KEEFE.
ROTARY ENGINE.
No. 326,054. Patented Sept. 8, 1885.
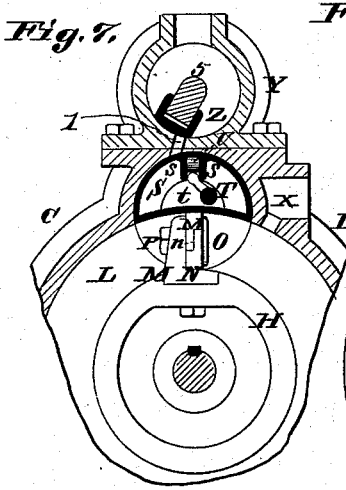
Fig. 7.
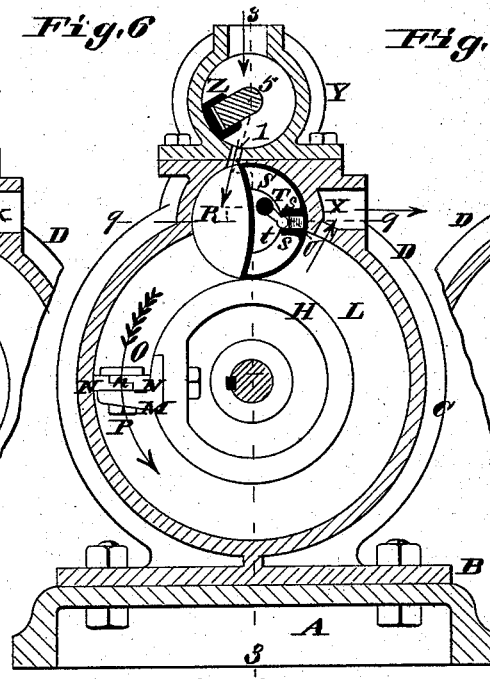
Fig. 6.
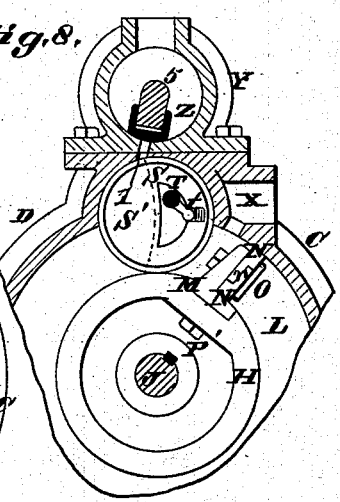
Fig. 8.
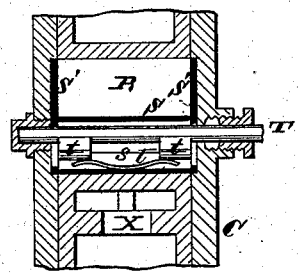
Fig. 9.
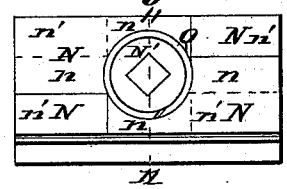
Fig. 10.
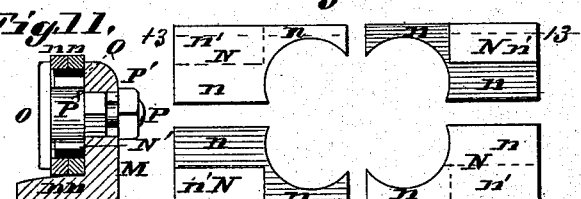
Fig. 11. Fig. 12.
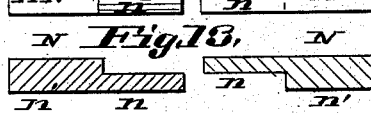
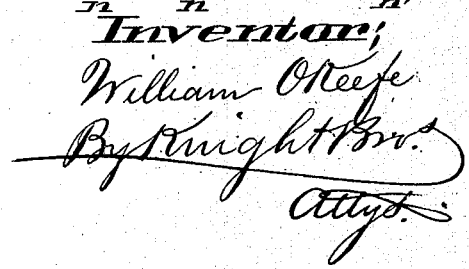
Fig. 13.
Attest:
Edward Stew.
Geo. L. Wheelock.
Inventor:
William O'Keefe
By Knight Bros.
Attys.

ically,
UNITED STATES PATENT OFFICE.

WILLIAM O'KEEFE, OF ST. LOUIS, MISSOURI.

ROTARY ENGINE.

SPECIFICATION forming part of Letters Patent No. 326,054, dated September 8, 1885.

Application filed April 18, 1885. (No model.)

*To all whom it may concern:*

Be it known that I, WILLIAM O'KEEFE, of the city of St. Louis, in the State of Missouri, have invented a certain new and useful Improvement in Rotary Engines, of which the following is a full, clear, and exact description, reference being had to the accompanying drawings, forming part of this specification.

Figure 3:
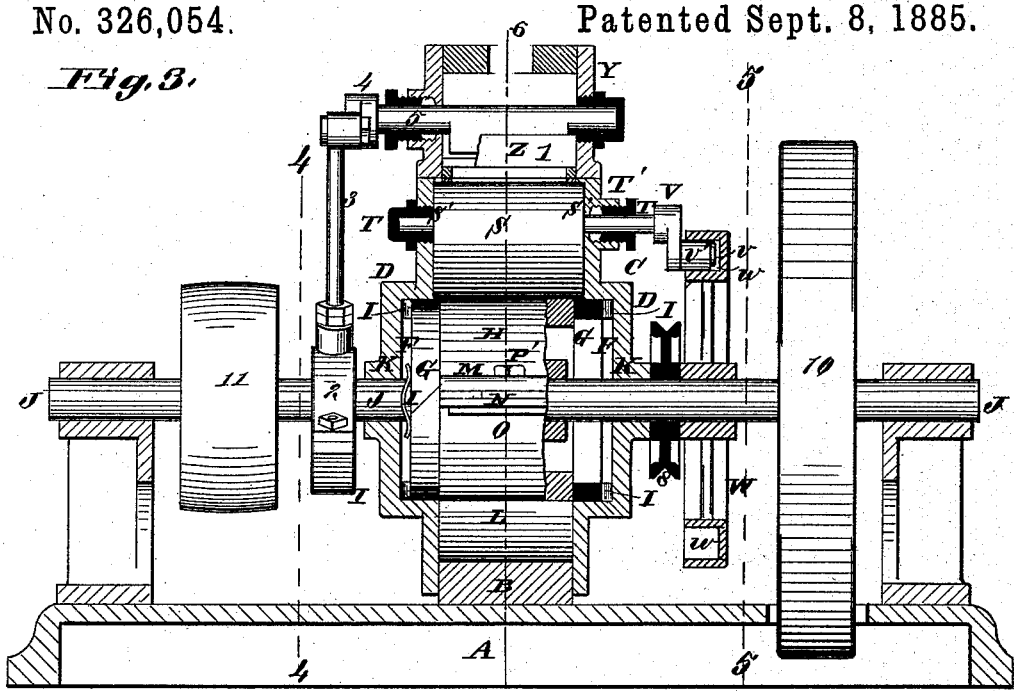
Figure 4:
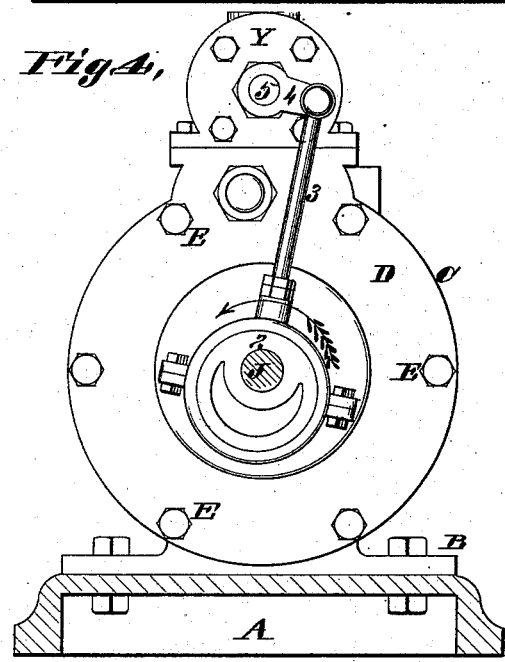
Figure 5:
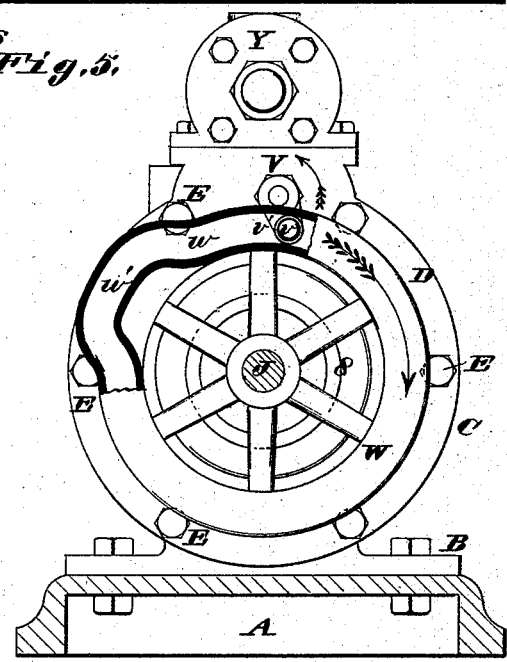

Figure 1 is an elevation of the engine, and Fig. 2 is a top view of the same with the governor removed. Fig. 3 is a section on line 3 3, Fig. 6. Fig. 4 is a section on line 4 4, Fig. 3. Fig. 5 is a section on line 5 5, Fig. 3. Fig. 6 is a vertical section on line 6 6, Fig. 3, and Fig. 7 is a section on same line showing a different position of the parts. Fig. 8 is a vertical section on a plane paralled with that of Fig. 6, showing the parts in different position. Fig. 9 is a horizontal section at 9 9, Fig. 6. Fig. 10 is an enlarged top view of the piston with the top plate removed, showing the top of sectional packing-plates and the circular spring by which they are pressed outward. Fig. 11 is a section through the piston at 11 11, Fig. 10, showing the top or cover plate in position. Fig. 12 is a top view of the packing-plate detached. Fig. 13 is a section of two of the packing-plates at 13 13, Fig. 12.

A is the bed-piece to which the base B of the cylinder C is bolted. The cylinder has two heads, D, shown as secured to the body of the cylinder by bolts E. In the heads are cylindrical recesses F, which contain spring packing-rings G, whose circumference fits the inside circumference of the recess, and whose edge fits the end of the piston-hub H.

I are springs which force the packing-ring against the piston-hub to insure a practically steam-tight joint. By means of the packing-rings G the necessity of packing the piston-shaft J in bearings K of the heads D is avoided.

L is the annular steam-space in which the piston revolves. The piston has a bracket, M, firmly fixed to or formed in one piece with the hub H. This bracket extends radially in the steam-space L, and almost touches the sides of the same, but actual contact with the sides is made by means of the sectional packing-plates N, which are shown as four in number and of uniform construction. These packing-plates are held in position by a cover-plate, O, which is held down upon them by a bolt, P, which has a square shank fitting a square hole of the bracket, and fitted with a nut, P'. The nut should have a shoulder, P², bearing against the side of the bracket opposite to the nut so that the bolt may be made tight in the bracket without pressing the cover-plate hard against the packing-plates.

It will be seen that the packing-plates are made with lips n, one-half the thickness of the parts n', the lips lapping past each other so as to make a steam-joint and to allow the plates to move upon each other. The plates are made with a rounded recess at one corner, so that when four of them are put together, as seen in Fig. 10, a circular recess, N', is formed, into which is dropped a circular spring, Q, which presses all the packing-plates N outward against the walls of the annular steam-space L.

At the top of the steam-space is a recess, R, nearly or quite semi-cylindrical in form, and in this recess oscillates the tumbler S, which forms the abutment to receive the pressure of the steam when acting upon the piston. The tumbler has nearly the form of a half-cylinder, its transverse section being shown in Figs. 6 and 7, the outer curve having much the smaller radius and fitting accurately the interior of the recess R, while the inner curve, when the tumbler is in the position shown in Fig. 7, exactly coincides with the circumference of the steam-chamber L, and, in fact, forms part of that circumference. When the tumbler is in the position shown in Fig. 6, its edge fits snugly against the hub H and the packing-rings G, so that the steam does not pass between them. The tumbler is made hollow and should be made with circular heads S', having bearing in circular recesses in the heads of the cylinder.

Through the tumbler passes the rock-shaft T, by which it is oscillated, the rock-shaft having toes t, which work between lugs s extending inwardly from the shell of the tumbler.

U is a spring, which is interposed between the toes t and the shell of the tumbler, and which tends to keep the tumbler in close contact with the side of the recess R.

Upon the rock-shaft is a crank, V, whose pin v enters a cam-groove, w, in the cam-wheel W, that is fast upon the piston-shaft J. The parts are so arranged that when the piston is passing the tumbler, the latter is in the position shown in Fig. 7, the crank-pin occupying the salient part $w'$ of the cam groove or channel when the tumbler is in this position. As the piston leaves contact with the tumbler, the latter rapidly turns into the position shown in Fig. 6, and so remains until the piston is about to reach it, when it again is turned into the position shown in Fig. 7. The crank-pin carries an anti-friction roller, $v'$.

T' is a stuffing-box.

X is the exhaust-port, made in proximity to the recess R, so that the steam or air driven before the piston shall escape until the piston has nearly reached the tumbler.

Y is the steam-chest, containing an oscillating valve, Z.

1 is the steam-port leading from the steam-chest to the recess R, through which the steam passes into the space L.

The oscillating valve may have any usual construction and be actuated by an eccentric, 2, upon the piston-shaft, whose rod 3 is connected to a crank, 4, upon the valve shaft 5.

6 is the steam-supply pipe, and 7 a governor actuated by a belt upon pulleys 8 and 9, which are upon the piston-shaft and the governor-shaft, respectively.

It will be seen that the valve can be arranged to cut off the supply of steam when the piston is at any part of its stroke. I have in practice with an engine of very similar construction cut off at about one-fourth stroke, so as to work the steam under expansion through nearly three-fourths of a stroke.

10 is a balance-wheel, and 11 a belt-pulley, upon the piston-shaft.

The tumbler is supported in such a manner that as its lower edge is worn away by friction of the piston-hub the tumbler settles down and keeps the joint tight.

I claim—

1. The tumbler occupying a recess in the circumference of the steam-space, in combination with the shaft for operating said tumbler, and the loose connection between said shaft and tumbler, whereby the latter is allowed to move laterally independently of the former, for the purpose set forth.

2. The combination, with a tumbler, S, for the purpose set forth, of a rock-shaft with projections working between projections within said tumbler, and a cam actuating the rock-shaft by means of a crank on said shaft.

3. The combination of the tumbler S, having interior projections, $ss$, a rock-shaft having projections $t$, working between the projections $s$, and spring U, for the purpose set forth.

4. The combination, with the hub, of the projection thereon having a number of overlapping packing-plates adjustable radially and longitudinally with respect to said hub, as and for the purpose set forth.

5. The combination, with the hub and the bracket projecting therefrom, of the overlapping packing-plates secured thereto, and a spring for forcing said plates radially outward and longitudinally relatively to said hub, as set forth.

6. The combination, with the hub H and the bracket M, of the packing-plates reduced in thickness and overlapping each other at their contiguous edges, the expansion-ring Q, and a bolt for securing them to the bracket, as set forth.

7. The combination, with the hub H and the bracket M projecting therefrom, of the plates N, movable radially and longitudinally with respect to said hub, and the cover-plate O, and bolt P, for holding said plates in place on said bracket, as set forth.

8. The combination, with the hub H and the bracket M, of the movable packing-plates N, each cut away at one corner, as described, the cover-plate O, and the shoulder-bolt P $P^2$, for securing said plates to said bracket, as set forth.

9. The combination, with the cylinder, the rotary piston fitted therein, the annular spaces at the ends of said cylinder, and the tumbler, of expansion packing-rings fitting in said recesses and springs for forcing them against the ends of said cylinder whereby said tumbler and cylinder are packed, substantially as set forth.

10. The combination, with the main shaft of a rotary engine and the rotary piston, of a tumbler, a cam carried by the said shaft for operating said tumbler, an oscillatory valve and an eccentric on said shaft for operating it, substantially as and for the purposes set forth.

11. In a rotary engine, the combination of the rotary piston, the segmental tumbler having circular heads, a recess in the circumference of the cylinder in which said tumbler works, and annular recess in which said circular heads fit, as set forth.

WILLIAM O'KEEFE.

Witnesses:
SAML. KNIGHT,
BENJN. A. KNIGHT.